March 14, 1944. R. D. MacDONALD 2,344,317
CONTROL MEANS FOR MANURE SPREADERS
Filed Feb. 13, 1942
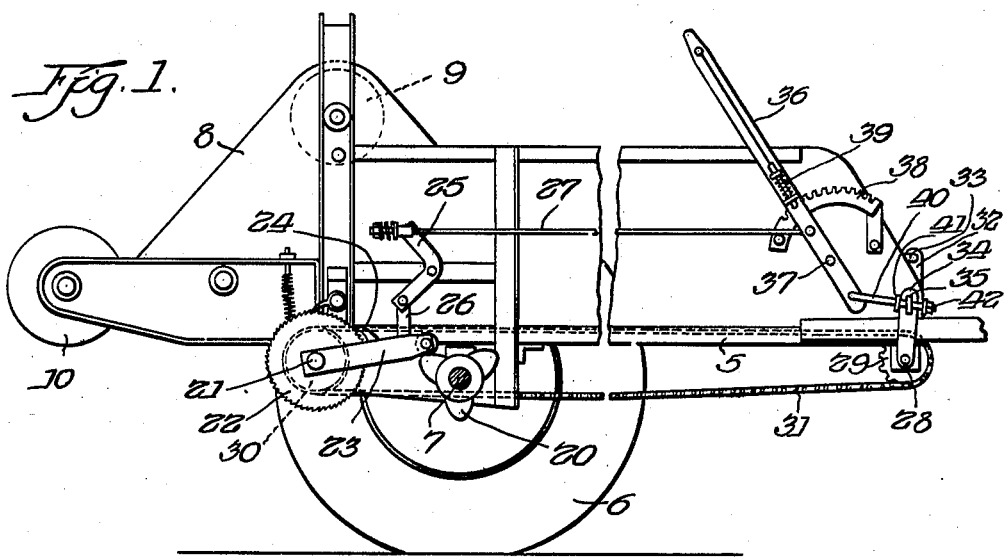
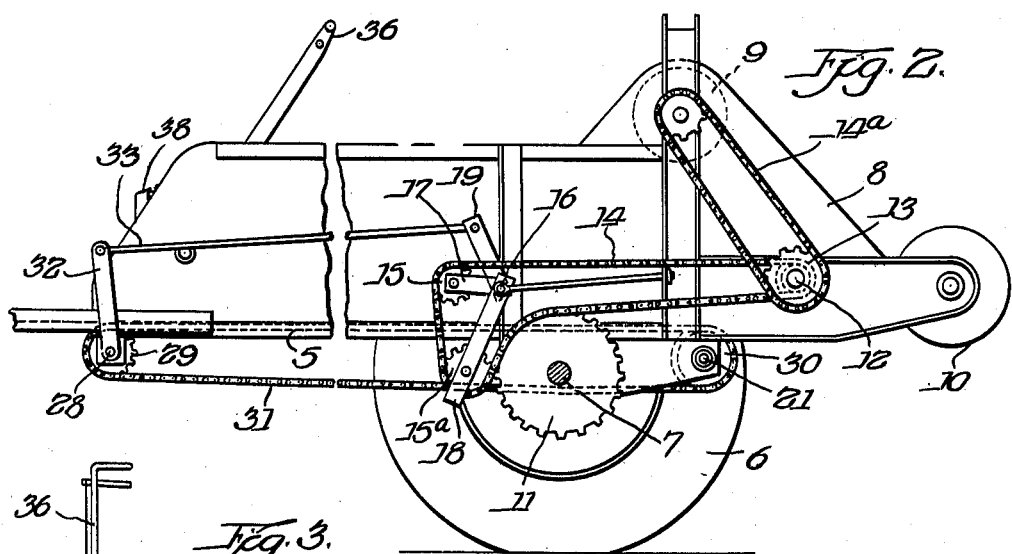
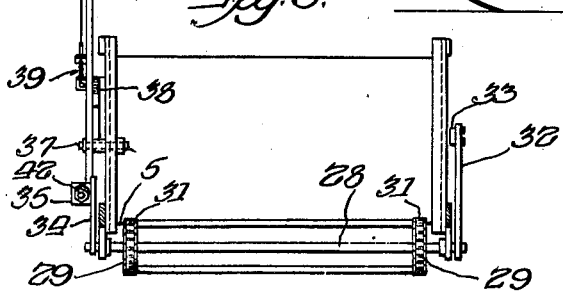
Inventor:
Raymore D. MacDonald

UNITED STATES PATENT OFFICE 2,344,317

CONTROL MEANS FOR MANURE SPREADERS

Raymore D. MacDonald, Battle Creek, Mich., assignor to International Harvester Company, a corporation of New Jersey Application February 13, 1942, Serial No. 430,778

10 Claims. (Cl. 275—5)

This invention relates to a manure spreader, or the like, and particularly to improvements in the driving and control mechanisms therefor.

In a spreader of the conventional type, there is usually provided a longitudinal body carried on front and rear wheels, or the spreader may be of the type in which the front end is directly supported on a tractor or other draft vehicle. The rear end of the body includes distributing mechanism for discharging and spreading material at the rear of the spreader, material being supplied to the distributing mechanism by means of feeder means in the form of a longitudinally running endless belt or apron. This apron is driven in the usual case by pawl and ratchet mechanism from one of the rear wheels of the spreader. The distributing mechanism is driven through appropriate driving means from the other rear wheel. It has been common practice heretofore to provide a pair of separate control means for separately controlling each of the driving means for the feeder and distributing mechanisms. According to the present invention the control means is simplified and improved by the provision of a single control element for operating or controlling both of the mechanisms referred to.

The principal object of the invention is to provide an improved control means of the type mentioned above, in which a single control lever serves to control the operation of both the driving mechanisms to the feeder and distributor.

An important object of the invention is to arrange the control means so that the control of each driving means may be effected independently of the other, this result being preferably accomplished by the provision of lost-motion means in the control connections.

Another important object is the provision of control linkage in such a manner that the driving means for the feeder will be disengaged prior to the disengagement of the driving means for the distributor.

A still further object is to provide a control rock-shaft for the mounting and connecting of the control mechanism.

And another object is to provide means for the utilization of this rock-shaft as a support for one end of the feeder belt or apron.

A more complete understanding of the foregoing and other objects of the invention may be had from the following detailed description and accompanying sheet of drawings, in which:

Figure 1 is a side elevational view of a conventional type of spreader construction embodying a preferred form of the invention;

Figure 2 is a side elevational view showing the opposite side of the spreaders; and Figure 3 is an end elevation showing the front end of the spreader.

For the purposes of illustration and exposition, a conventional type of manure spreader has been shown and will be described, it being understood further that the invention may be suitably adapted to other types of spreaders and like machines. As shown in the drawing, the spreader includes a longitudinal body 5 carried on a pair of rear wheels 6 mounted on a transverse axle 7. The rear end of the body 5 is provided with a suitable supporting structure 8 in which is mounted an upper beater 9 and a lower or wide-spread beater 10, these beaters comprising part of a well-known type of material-distributing means. At the left side of the spreader, as shown in Figure 2, the rear axle 7 carries a comparatively large driving sprocket 11. The supporting structure 8 carries a stub-shaft 12 on which is carried a sprocket 13. A drive chain 14 is trained about the sprocket 13 and about a pair of sprockets 15 and 15a, which are carried by disengageable driving means preferably in the form of the conventional chain-raising device. This device is best shown in Figure 2 and is shown as including a transverse stub-shaft 16 on which is mounted a pair of arms 17 and 18. These arms respectively carry the sprockets 15 and 15a. A third arm 19 is carried on the stub-shaft 16 for movement with the arm 18 so that rocking movement about the shaft 16 will result in swinging movement of the arm 18 about that shaft. As will be understood by those skilled in the art, rocking movement of the arms 18 and 19 results in raising and lowering the lower run of the drive chain 14, thus effecting engagement and disengagement between this chain and the drive sprocket 11 on the spreader axle 7. The beaters 9 and 10 are suitably driven by means including a drive chain 14a trained about the sprockets on the shaft 12 and the transverse shaft on which the beater 9 is carried. At the opposite side of the spreader, as shown in Figure 1, the drive axle 7 carries for rotation therewith a driving member in the form of a cam 20. At the rear of the spreader, there is rotatably mounted a transverse shaft 21. A ratchet wheel 22 is keyed to the shaft and is driven in the usual manner by an arm 23 loosely mounted on the shaft 21 and engageable at one end with the lobes of the cam 20.

The arm 23 carries the usual pawl 24. The driving means just described is generally conventional, and its operation is effected by rotation of the cam 20 when the spreader is moved over the ground, intermittent engagement between the lobes of the cam 20 and the arm 23, imparting step-by-step movement to the shaft 21 through the pawl and ratchet mechanism 22—23—24. The means for controlling the operation of the pawl and ratchet mechanism may take the form of the usual control means consisting of a bell-crank 25 pivoted at the side of the body, having one arm thereof connected by a link 26 to the driving arm 23 and having the other arm thereof connected to a forwardly extending control link 27. This control link is connected to control means on the forward end of the spreader, a detailed description of which will follow.

The forward end of the spreader carries a transverse rock-shaft 28 journaled in suitable brackets at opposite sides of the spreader body. Between the sides of the body, the shaft 28 carries rotatably thereon a pair of transversely spaced sprockets 29. These sprockets are similar to sprockets 30 carried at the rear end of the spreader on the transverse shaft 21, and the two sets of sprockets serve to carry or support a longitudinally running endless feeder belt or conveyer 31 which comprises the feeding means for the spreader. This means is driven by the pawl and ratchet mechanism and serves in the usual manner to move material to the rear of the spreader to be distributed by the beaters 9 and 10.

The shaft 28 carries rigidly thereon at its left-hand end an upwardly extending arm or lever 32. The upper end of this lever is connected to the forward end of a link 33, and the rearward end of the link is pivotally connected to the upper end of the arm 19 of the chain-raising device. It will be understood, of course, that rocking of the shaft 28 imparts movement to the chain-raising device for raising and lowering the chain from and to the drive sprocket 11. The right-hand end of the shaft 28 carries rigidly thereon an upstanding arm or lever 34, at the upper end of which is carried an apertured ear 35. Slightly rearwardly and above the shaft 28, there is mounted a control lever 36. This lever is mounted for fore and aft rocking movement about a transverse pivot axis on a pivot pin 37. A sector 38 of conventional type is carried by the spreader body and is notched in the usual manner for cooperation with detent mechanism 39 for positioning of the lever 36. The lower end of the lever extends downwardly beyond the pivot point 37 and carries the rearward end of a forwardly extending link 40. This link extends through the apertured ear 35 on the arm 34 and is provided with two stop members 41 and 42 disposed respectively at opposite sides of the ear 35. These members may take the form of nuts or adjustable members. The link 27 is connected at its forward end to an intermediate portion of the lever 36.

In the operation of the preferred construction described, the lever 36 serves to control both the chain-raising device and the means for effecting operation of the pawl and ratchet mechanism for the feeder apron 31. Assuming that the parts are in the positions indicated in the drawing, in which case the spreader is in operative condition, movement of the lever 36 may be effected to control independently either the chain-raising device or the arm 23. Upon initial movement of the lever 36 in a forwardly direction, the link 40 moves rearwardly until the stop member 42 engages the ear 35 on the arm 34. Through this initial movement, the linkage 25—26—27 serves to raise the arm 23 free of contact with the cam 20, thus disengaging the drive to the feeder apron 31. Meanwhile, the distributors or beaters continue to operate. Continued or subsequent movement of the lever 36 in a forwardly direction now moves the arm 34 rearwardly, since the stop member 42 is engaged with the ear on the arm. This movement rocks the rock-shaft 28 in a clockwise direction, as viewed in Figure 2, and the arm 32 is moved rearwardly, thus effecting a raising of the chain-raising mechanism so that the lower run of the drive chain 14 is disengaged from the drive sprocket 11. It will thus be apparent that the lost-motion connection, provided by the parts 34—35—41—42, enables disengagement of the apron-driving means independently of and prior to disengagement of the beater-driving means. This sequence of operation is desirable inasmuch as damage to the beaters is prevented, since the feeder apron does not continue to pile up material against the stationary beater 9, which would be the case if the sequence of operation were reversed. The lost-motion connection is of further importance in that it permits adjusting of the arm 23 with respect to the cam 20 for the purpose of regulating the intervals of intermittent movement of the beater apron 31. For example, if the arm 36 is moved rearwardly from the position shown in Figure 1, the arm 23 can be lowered without any effect on the arm 34, since the stop member 41 is spaced from the ear 35. It is not necessary that arrangement be made for any particular adjusting of the mechanism for the drive chain 14, since this chain has only two positions: engagement with or disengagement from the drive sprocket 11.

As will be apparent from the foregoing description, an important feature of the invention is the provision by which the forward end of the feeder apron or belt 31 is carried on the rock-shaft 28, the rock-shaft thus being common to both the feeder apron and the control mechanism.

Several important features of the invention will immediately suggest themselves to those versed in the art, it being understood that only a preferred embodiment of the invention has been illustrated and described, and that numerous modifications and alterations may be made therein without departing from the spirit and scope of the invention as defined in the appended claims.

What is claimed is:

1. For a material spreader having a longitudinal wheeled body, a longitudinal feeder apron for moving material to the rear of the body, disengageable cam and ratchet means for driving the apron, distributor means, and means for driving the distributor means including a chain driven by a wheel of the spreader: the combination of single control means for controlling both the cam and ratchet means and the distributor-driving means in sequence comprising a transverse rock-shaft, an arm rigid on the rock-shaft, means for disengaging the chain from the wheel, means operatively connecting said means and the arm on the rock-shaft, a second arm rigid on the rock-shaft, a control lever movably carried on the spreader body, means connecting the lever to the cam and ratchet means, and means including a lost-motion connection connected between the lever and the second arm on the rock-shaft whereby operation of the lever first disengages the cam and ratchet means and then operates the chain-disengaging means.

2. For a material spreader having a longitudinal body, a longitudinal feeder apron for moving material to the rear of the body, disengageable means for driving the apron, distributor means, and disengageable means for driving the distributor means: the combination of single control means for controlling both the apron-driving means and the distributor-driving means in sequence comprising a transverse rock-shaft, an arm rigid on the rock-shaft and operatively associated with the distributor-driving means, a second arm rigid on the rock-shaft, a control lever movably carried on the spreader body, means connecting the lever to the apron-driving means, and means including a lost-motion connection connected between the lever and the second arm on the rock-shaft whereby operation of the lever disengages first the apron-driven means and then the distributor-driving means.

3. For a material spreader including a body, material-discharge means, means for driving said means including disengageable means for stopping the drive thereto, material-distributor means, and means for driving said means including disengageable means for stopping the drive thereto: the combination of a single control means for operating the disengageable means for both the discharge means and the distributor means in sequence comprising a rock-shaft rockably carried by the spreader body, means operatively connecting the rock-shaft and one disengageable means, means including a lost-motion connection operatively connecting the rock-shaft and the other disengageable means, and means for rocking the rock-shaft whereby rocking of the rock-shaft controls the two disengageable means in sequence.

4. For a material spreader including a longitudinal body, the combination of a longitudinal feeder belt carried in the body for moving material longitudinally of the body, disengageable drive means for the feeder belt, distributing means, disengageable drive means for the distributing means, a transverse shaft rockably carried by the body, means carrying the feeder belt on the rock-shaft, means connected between the rock-shaft and the drive means for the feeder belt for engaging or disengaging said drive means upon rocking of the rock-shaft, means connected between the rock-shaft and the drive means for the distributing means for engaging or disengaging said drive means upon rocking of the rock-shaft, and means for rocking the rock-shaft.

5. For a material spreader including a longitudinal body, the combination of a longitudinal feeder belt carried in the body for moving material longitudinally of the body, disengageable drive means for the feeder belt, a transverse shaft rockably carried by the body, means carrying the feeder belt on the rock-shaft, means connected between the rock-shaft and the drive means for the feeder belt for engaging or disengaging said drive means upon rocking of the rock-shaft, and means for rocking the rock-shaft.

6. For a material spreader including a longitudinal body, the combination of a longitudinal feeder belt carried in the body for moving material longitudinally of the body, disengageable drive means for the feeder belt, distributing means, disengageable drive means for the distributing means, a transverse shaft rockably carried by the body, means carrying the feeder belt on the rock-shaft, means including a lost-motion connection connected between the rock-shaft and one drive means for engaging or disengaging said drive means upon rocking of the rock-shaft, means connected between the rock-shaft and the other drive means for engaging or disengaging said drive means upon rocking of the rock-shaft, and means for rocking the rock-shaft.

7. For a material spreader including a longitudinal body, the combination of a longitudinal feeder belt carried in the body for moving material longitudinally of the body, disengageable drive means for the feeder belt, distributing means, disengageable drive means for the distributing means, a transverse shaft rockably carried by the body, means carrying the feeder belt on the rock-shaft, an arm rigid on the rock-shaft, means connected between the arm and the drive means for the distributing means for engaging and disengaging said drive means upon rocking of the rock-shaft, a second arm rigid on the rock-shaft, a control lever movably carried by the body, means connected between the lever and the drive means for the feeder belt for engaging and disengaging said drive means, and means including a lost-motion connection connected between the lever and the second arm.

8. In a material spreader having a longitudinal body, the combination of feeder means for moving material longitudinally of the body comprising a longitudinally running endless belt, means including a first shaft supporting said belt adjacent one end of the body, means including a second shaft supporting said belt adjacent the other end of the body, controllable driving means for the feeder belt, and means for controlling said driving means including a control member connected to one of the aforesaid shafts.

9. In a material spreader having a longitudinal body, the combination of material distributing means at one end of the body, feeder means for moving material longitudinally of the body to the distributing means comprising a longitudinally running endless belt, means including a first shaft supporting said belt adjacent one end of the body, means including a second shaft supporting said belt adjacent the other end of the body, controllable driving means for the distributing means, controllable driving means for the feeder belt, and means for controlling one of said driving means including a control member connected to one of the aforesaid shafts.

10. In a material spreader having a longitudinal body, the combination of feeder means for moving material longitudinally of the body comprising a longitudinally running endless belt, means including a first shaft supporting said belt adjacent one end of the body, means including a second shaft supporting said belt adjacent the other end of the body, controllable driving means for the feeder belt, and means for controlling both of said driving means including a pair of control elements connected to one of the aforesaid shafts.

RAYMORE D. MacDONALD.